United States Patent Office 3,839,482
Patented Oct. 1, 1974

---

3,839,482
OLEFIN SEPARATION PROCESS
Herman S. Bloch, Skokie, Ill., assignor to Universal Oil Products Company, Des Plaines, Ill.
No Drawing. Filed Dec. 21, 1972, Ser. No. 317,328
Int. Cl. C07c 11/00
U.S. Cl. 260—677 A                                    9 Claims

ABSTRACT OF THE DISCLOSURE

A process for the separation of olefins from a paraffinic, olefinic and aromatic mixture by passage of said mixture over a thiol resin whereby a separation of the desired olefin is accomplished by formation of a thio-ether.

---

This invention relates to a process for the separation of an olefin from a mixture of paraffinic, olefinic and aromatic compounds. More specifically, this invention relates to a process for the separation of an olefin from a mixture of paraffinic, olefinic and aromatic compounds by contacting said mixture with a thiol-containing resin and recovering the resultant olefin.

It has been shown in the prior art that olefins may be extracted from a paraffinic, olefinic and aromatic mixture by fractional extraction using a heavy metal salt cation exchange resin from the Groups IB and IIB of the Periodic Table or by utilization of complex forming reagents such as urea and thiourea in a fractional extraction process to separate branched and straight chained organic compounds.

In contradistinction to the prior art, it has now been discovered that a thiol resin may be utilized in the separation of an olefin from a mixture of paraffinic, olefinic and aromatic compounds by contacting said mixture with the resin thereby forming thio-ethers while not impeding the passage of non-olefinic components of the mixture through the separation zone. The thiol resin can also be utilized in the separation of $\alpha$-olefins from internal olefins by contacting a mixture of olefins with a thiol resin thereby forming thio-ethers with the $\alpha$-olefins while not impeding the internal olefin passage over the resin through the separation zone. The thiol resin bed can be regenerated by the addition of heat to reform the olefin and the thiol resin thereby enabling the manufacturer of the olefins to lower the operational costs as a result of the elimination of treating any cationic resin with regeneration reagents or the purchase of new separation chemicals as urea or thiourea. The reduction in the manufacturing cost will enable the manufacturer to lower the price of the olefins thereby reducing the consumer's cost in the many ways in which olefins are utilized.

The desired products of this separation process, namely, the olefins, are utilized in the chemical industry in many ways. For example, some of the ways in which the olefins are utilized in the chemical industry include the use of ethylene as a coloring agent in fruits and blanching of vegetables, to increase the growth rate of seedlings, in welding and cutting metals, in medicine as an anesthetic, or the use of octenes as an anti-knock agent for gasoline, as a starting material for the preparation of diolefins, alcohols and aldehydes and the use of pentenes in the synthesis of organic flavors, perfumes, medicines, dyes and resins.

It is therefore an object of this invention to provide a process for the preparation of an olefin from a mixture of paraffinic, olefinic and aromatic compounds.

A further object of this invention is to provide a process for the separation of an olefin utilizing a thiol resin which will permit the recovery of the desired olefinic compound in a more expedient manner.

In one aspect an embodiment of this invention resides in a process for the separation of an olefin from a mixture of paraffinic, olefinic or aromatic compounds which comprises contacting said mixture with a thiol resin at reaction conditions whereby the olefins are converted to thio-ethers and retained thereby while the non-olefinic compounds pass through said resin, and recovering the resultant olefin.

A specific embodiment of this invention resides in a process for separating butene-2 from a mixture containing butene-2, propane and butane which comprises contacting said mixture with a vinyl thiophenol-divinyl-benzene-styrene copolymer whereby the butene-2 forms a thio-ether upon the resin while the other components of the mixture, propane and butane pass over the said resin. The resin is purged with decane to insure an absence of all non-olefinic compounds except decane in association with the thio-ether. The thio-ether is heated which regenerates the butene-2 and some butene-1 and the vinyl thiophenol-divinylbenzene-styrene copolymer. The butenes are separated from any decane present by means of distillation.

Another specific embodiment of this invention relates to a process for the separation of pentene-1 from a mixture which consists of pentene-1, pentene-2, heptene-2 and pentane which comprises contacting a thio-methacrylic acid-divinylbenzene-methyl methacrylate copolymer in granular form with said mixture at a liquid hourly space velocity regulated so as to provide that pentene-1 will form a thio-ether upon the thiol resin and is therefore retained while the other paraffinic and olefinic compounds, namely, pentene-2, heptene-2 and pentane, pass over the thiol resin. The resin is purged with nonane to insure the removal of the unreacted feed components. The thio-ether is heated, which liberates a mixture of pentene-2 and pentene-1 and the thio-methacrylic acid-divinylbenzene-methyl methacrylable copolymer. The $n$-pentenes are subsequently purified from any remaining nonane by distillation.

Other objects and embodiments will be found in the following further detailed description of the present invention.

As herein set forth the present invention is concerned with a process for separating an olefin from a mixture of paraffinic, olefinic and aromatic compounds or separating an $\alpha$-olefin from internal olefins by utilizing a thiol resin. The separation is effected under reaction conditions which include a temperature in the range of from about 25° C. to about 150° C. and a pressure in the range of from about atmospheric to about 100 atmospheres. When superatmospheric pressures are to be employed said pressure may be generated autogenously or may be afforded by the introduction of a substantially inert gas such as nitrogen, helium or argon into the separation zone, the particular pressure which is used being that which is necessary to maintain a predetermined liquid phase level throughout the separation process. Another variable present is the liquid hourly space velocity which is defined as the volume of charge stock entered per hour to the separation zone per volume of thiol resin within the separation zone. The liquid hourly space velocity controls the retention time of the mixture through the thiol resin and is generally in the range of about 0.1 to about 25, being maintained at a rate determined by the relative rates of forming the thio-ethers among the various components of the original mixture, as well as the temperature.

Examples of suitable olefins that may be obtained from such a process would include but are not limited to ethylene, propylene, butene-1, butene-2, isobutene, pentene-1, pentene-2, 2-methylbutene-1, 2-methylbutene-2, hexene-1, 3-methylpentene-1, 2-methylpentene-2, heptene-2, 2-methylhexene-2, 3-methylhexene-2, octene-3, octene-2, 3- methylheptene-1, 2-methylheptene-2, nonene-2, 3-methyloctene-2, decene-2, decene-3, 3,4-dimethyloctene-2, 4-ethyloctene-2, undecene-3, undecene-4, 4-methyldecene-2, 4,5-dimethylnonene-2, dodecene-3, tridecene-2, tetradecene-3, pentadecene-5, heptene-1, octene-1, nonene-1, decene-1, undecene-1, dodecene-1, tridecene-1, tetradecene-1, pentadecene-1, etc.

Suitable mixtures utilized in this separation process include any mixture of paraffinic, olefinic or aromatic compounds. Some specific examples of the mixtures which may be involved include, in particular, butene-2, propane, methane, ethane and butane; pentene-2, pentane, heptane, hexane and benzene; pentene-1, pentene-2 and heptene-2; heptene-1, nonane, decane, cumene, toluene and p-xylene; decene-4, p-xylene, m-xylene, pseudocumene and hexamethylbenzene; nonene-1, nonane, heptane, decane and undecane; ethylene, propane, methane and ethane; pentene-2, pentane, butane and benzene; pentene-1, pentene-2, heptene-2 and nonene-3; octene-1, octene-2, octene-3 and pseudocumene; nonene-4, ethylbenzene, n-butylbenzene, p-xylene and toluene; undecene-5, undecane, tetradecane, o-xylene, m-xylene, p-xylene and cumene; decene-1, 1,2,4,5,6-pentamethylbenzene, 1,4-diethylbenzene, 1,6-di-n-butylbenzene and sec-butylbenzene; pentadecene-3, nonylbenzene, decylbenzene, hexamethylbenzene, and 1,2,3,5,6-pentamethylbenzene; tetradecene-1, undecene-2, tridecene-2, decene-3, heptene-3, octene-2, nonene-3, nonene-2, nonene-4, benzene, toluene, o-xylene, m-xylene, p-xylene and pseudocumene, etc. It is understood that the aforementioned olefin separation products and the original mixtures are only representative of the class of compounds which may be employed and that the present invention is not necessarily limited thereto.

Another variable which is employed in the separation process is the thiol resin utilized to effect the separation. The thiol resin comprises a vinyl thiophenol, a thioaryl acrylate or an unsaturated thio acid and a divinylbenzene-styrene or divinylbenzene-methyl methacrylate copolymer. Some suitable examples of thiol resins which may be utilized include vinyl thiophenol-divinylbenzene-styrene copolymer, thio-methacrylic acid-divinylbenzene-methyl methacrylate copolymer, thio-methacrylic acid-divinylbenzene-styrene copolymer, thiopentacrylic acid-divinylbenzene-styrene copolymer, thio-hexacrylic acid-divinylbenzene-methyl methacrylate copolymer, p-thiophenyl acrylate-divinylbenzene-styrene copolymer, p-thiophenyl methacrylate - divinylbenzene - styrene copolymer, p-thiotolyl ethacrylate-divinylbenzene-styrene copolymer, etc. It is understood that the aforementioned thiol resins are only representative of the class of thiol resins which may be employed and that the present invention is not necessarily limited thereto.

The process of this invention may be effected in any suitable manner and may comprise either a batch or continuous type of operation. For example, when a batch type operation is employed, the mixture of paraffinic, olefinic and aromatic compounds is placed in an appropriate vessel which would include a flask if the reaction is to be effected at ambient pressure or a pressure-resistant vessel such as an autoclave if super-atmospheric pressures are to be employed containing the thiol resin. After maintaining the vessel at a predetermined temperature, it is drained of all constituents, refilled with a hydrocarbon, rotated vigorously and redrained of all constituents. At this point the vessel is heated to a predetermined temperature while the gaseous or liquid phase egressing from the resin is trapped as the pure olefin desired. Where the hydrocarbon purge remains as an impurity in the olefin product, a distillation may be necessary to purify the olefin. Alternatively, if superatmospheric pressures are to be employed in the separation, the paraffinic, olefinic and aromatic mixture is charged to an autoclave containing the thiol resin while substantially inert gas such as nitrogen is pressed in until the desired operating pressure is reached. The autoclave is then heated to effect the separation for a predetermined period of time at which point heating is discontinued and the autoclave is purged, heated and the desired olefin is recovered as heretofore mentioned when operating at ambient pressure. Suitable examples of hydrocarbons which may be used in the separation process to flush the resin bed after the formation of the thio-ethers include methane, ethane, propane, butane, pentane, hexane, heptane, octane, decane, undecane, pentadecane, eicosane, benzene, toluene, o-xylene, m-xylene, p-xylene, cumene, ethylbenzene, 1,2-diethylbenzene, 1,2,3,4,5 - pentamethylbenzene, pseudocumene, hexamethylbenzene, etc. the choice being such as to provide a flushing material which is non-reactive with the thiolic copolymer and easily separable from the recovered olefin. The procedure is utilized to insure that all hydrocarbons have been removed from the resin except those retained as thio-ethers and those utilized as the purging agents.

It is also contemplated within the scope of this invention that the reaction process for obtaining the olefin may be effected in a continuous manner of operation. When such a type of operation is employed, the paraffinic, olefinic and aromatic mixture or a mixture of α- and internal olefins is continuously charged to a reaction zone which contains a bed of granular thiol resin, said zone being maintained at the proper operating conditions of temperature and pressure. The liquid hourly space velocity is determined by the temperature and differences in rates of forming the thio-ethers between the various components of the mixture, and is maintained thereat by a constant monitoring of the amount of mixture charged per hour into the separation zone. After completion of the desired residence time as controlled by the liquid hourly space velocity, the resin bed, after purging of the unreacted feed components, is heated, generally to a temperature in the range of about 150° to about 300° C., thereby decomposing the thio-ether to the thiol resin and the desired olefin. The thiol resin is thereafter re-utilized as the separating agent. The remaining mixture which has not been retained by the formation of the thio-ethers is recovered as the raffinate stream from the reactor vessel.

Another type of continuous operation which may be employed comprises the slurry type process in which the paraffinic, olefinic and aromatic mixture is passed through the reaction zone in a slurry with the thiol resin in finely divided form, the thio-ether compounds are withdrawn as the reactor effluent and heated to reform the separated olefin and thiol resin, which can be recharged to the slurry as a separating agent.

The following examples are given to illustrate the process of the present invention which, however, are not intended to limit the generally broad scope of the present invention in strict accordance therewith.

EXAMPLE I

In this example a mixture of butene-2, propane and butane with a trace of air are added to an autoclave containing a vinyl thiophenol-divinylbenzene-styrene copolymer. The autoclave is maintained at a temperature of 50° C. and a pressure of 15 atmospheres for 1 hour at which time the pressure is released and the residual gases vented. The resin in the autoclave is heated to 180° C. while the egressing gas is recovered and analyzed by means of gas chromatography, said analysis establishing the gas to consist of a mixture of butenes high in butene-2. Further analysis performed on the remaining mixture indicated that the mixture after treatment with the vinyl-thiophenol resin is substantially butene-2 free. The resin is recovered from the autoclave after heating and analyzed by means of infra-red, said analysis discloses the resin is substantially that of the vinyl thiophenol-divinylbenzene-styrene copolymer used to initiate the separation.

EXAMPLE II

In his example a moving resin bed of p-thiophenyl methacrylate-divinylbenzene-styrene copolymer is utilized while a mixture of pentene-2, pentane, hexane, octane and benzene with traces of air, is flushed through the resin at a liquid hourly space velocity of 2.3. The separation zone is maintained at a temperature of 60° C. and a pressure of 10 atmospheres. The mixture which passes through the p-thiophenyl methacrylate resin is analyzed by means of gas chromatography; said analysis discloses a pentene-2 free mixture. The resin recovered is heated to 185° C. and the gas egressing therefrom recovered and analyzed by means of gas chromatography, said analysis discloses a substantially high purity mixture of pentene-1 and pentene-2. The thiol resin is analyzed by infra-red, and said analysis shows the resin possesses almost identical properties to that which is used to initiate the separation process.

EXAMPLE III

In this example a moving resin bed of thio-methacrylic acid-divinylbenzene-methyl methacrylate polymer is utilized while a mixture of pentene-1, pentane, pentene-2 and heptene-2 with a trace of air, is charged to the separation zone at a rate of 3.2 liquid hourly space velocity. The separation zone is maintained at a temperature of 40° C. and a pressure of 10 atmospheres. The mixture which passes through the thio-methacrylic acid resin is analyzed by means of gas chromatography; said analysis discloses a pentene-1 free mixture. The resin recovered is heated to 160° C. and the escaping gas recovered and analyzed by means of gas chromatography, said analysis discloses a mixture of pentene-1 and penetene-2. The thiol resin is analyzed after heating by infra-red, said analysis disclosed the resin possesses almost identical properties with that which is utilized to initiate the separation.

I claim as my invention:

1. A process for the separation of a mono-olefin from a mixture of paraffinic, olefinic or aromatic compounds which comprises contacting said mixture with a thiol resin and reacting the olefin with the resin. heating the resulting reaction product to a temperature sufficient to decompose the same to olefin and thiol resin, and recovering the thus liberated olefin.

2. The process of Claim 1 further characterized in that the olefin-resin reaction conditions include a temperature of about 25° C. to about 150° C. and a pressure of from about atmospheric to about 100 atmospheres.

3. The process of Claim 1 further characterized in that the olefin-resin reaction conditions include a liquid hourly space velocity from about 0.1 to about 25.

4. The process of Claim 1 further characterized in that the mixture contains butene-2, propane and butane and the recovered olefin comprises $n$-butenes.

5. The process of Claim 1 further characterized in that the mixture contains pentene-2, pentane, heptane, octane and benzene and the recovered olefin comprises $n$-pentene.

6. The process of Claim 1 further characterized in that the mixture contains pentene-1, pentane, pentene-2 and heptene-2 and the separated olefin is pentene-1.

7. The process of Claim 1 further characterized in that the thiol resin is a vinyl thiophenyl-divinylbenzene-styrene copolymer.

8. The process of Claim 1 further characterized in that the thiol resin is thioaryl acrylate-divinylbenzene-styrene copolymer.

9. The process of Claim 1 further characterized in that the thiol resin is a thio-methacrylic acid-divinylbenzene-methyl methacrylate copolymer.

References Cited

UNITED STATES PATENTS

| | | | |
|---|---|---|---|
| 3,121,124 | 2/1964 | Verdol | 260—677 |
| 3,629,478 | 12/1971 | Haunschild | 260—677 A |
| 3,634,534 | 1/1972 | Haunschild | 260—677 A |
| 1,968,601 | 7/1934 | Edlund et al. | 260—677 A |

DELBERT E. GANTZ, Primary Examiner

J. M. NELSON, Assistant Examiner

U.S. Cl. X.R.

260—676 R, 674 R